(12) United States Patent
Wu et al.

(10) Patent No.: US 11,370,107 B2
(45) Date of Patent: Jun. 28, 2022

(54) ROBOT FOR TRANSPORTING CARGO BOXES

(71) Applicant: Zhejiang Guozi Robot Technology Co., Ltd., Hangzhou (CN)

(72) Inventors: Weifeng Wu, Hangzhou (CN); Yikun Tao, Hangzhou (CN); Hongbo Zheng, Hangzhou (CN); Lingfen Zhu, Hangzhou (CN)

(73) Assignee: Zhejiang Guozi Robot Technology Co., Ltd., Hangzhou (CN)

( * ) Notice: Subject to any disclaimer, the term of this patent is extended or adjusted under 35 U.S.C. 154(b) by 244 days.

(21) Appl. No.: 16/466,382

(22) PCT Filed: Jan. 16, 2017

(86) PCT No.: PCT/CN2017/071280
§ 371 (c)(1),
(2) Date: Jun. 4, 2019

(87) PCT Pub. No.: WO2018/129738
PCT Pub. Date: Jul. 19, 2018

(65) Prior Publication Data
US 2020/0078936 A1 Mar. 12, 2020

(51) Int. Cl.
*B25J 5/00* (2006.01)
*B25J 9/16* (2006.01)
(Continued)

(52) U.S. Cl.
CPC ............... *B25J 5/007* (2013.01); *B25J 9/162* (2013.01); *B25J 9/1697* (2013.01); *B25J 19/02* (2013.01);
(Continued)

(58) Field of Classification Search
CPC .............................. B65G 1/0492; B25J 9/162
See application file for complete search history.

(56) References Cited

U.S. PATENT DOCUMENTS

| | | | | |
|---|---|---|---|---|
| 4,492,504 A | * | 1/1985 | Hainsworth | B66F 9/07 414/280 |
| 5,211,523 A | * | 5/1993 | Andrada Galan | B60L 3/04 414/280 |

(Continued)

FOREIGN PATENT DOCUMENTS

| CN | 102658542 | † | 9/2012 |
|---|---|---|---|
| CN | 102658542 A | | 9/2012 |

(Continued)

OTHER PUBLICATIONS

Translation of International Search Report and Written Opinion dated Aug. 18, 2017 in corresponding International application No. PCT/CN2017/071280; 5 pages.

*Primary Examiner* — Thomas Randazzo
(74) *Attorney, Agent, or Firm* — Blank Rome LLP

(57) ABSTRACT

A robot for transporting cargo box, relating to the field of automatic logistics storage, includes a drive unit, a cargo box storing unit and a cargo box delivery unit, wherein the drive unit drives the cargo box storing unit and the cargo box delivery unit to move together; the cargo box storing unit includes one or more cargo box storing spaces; the cargo box delivery unit is configured to deliver the cargo box between the storing space and the shelf.

12 Claims, 2 Drawing Sheets

(51) Int. Cl.
*B65G 1/04* (2006.01)
*B25J 19/02* (2006.01)
*B65G 1/137* (2006.01)

(52) U.S. Cl.
CPC ......... *B65G 1/0492* (2013.01); *B65G 1/1371* (2013.01); *G05D 2201/0216* (2013.01)

(56) References Cited

U.S. PATENT DOCUMENTS

| | | | |
|---|---|---|---|
| 9,002,506 B1* | 4/2015 | Agarwal | G06Q 10/087 |
| | | | 700/218 |
| 9,540,171 B2† | 1/2017 | Elazary | |
| 9,550,624 B2* | 1/2017 | Khodl | B25J 5/007 |
| 2008/0166217 A1 | 7/2008 | Fontana | |
| 2011/0194917 A1* | 8/2011 | Miksch | B23Q 3/15539 |
| | | | 414/222.07 |
| 2016/0236869 A1* | 8/2016 | Kimura | B65G 1/1378 |
| 2018/0082162 A1* | 3/2018 | Durham | G06K 7/10009 |
| 2020/0207546 A1* | 7/2020 | Borders | B65G 1/1375 |

FOREIGN PATENT DOCUMENTS

| | | | |
|---|---|---|---|
| CN | 105730956 A | | 7/2016 |
| CN | 205555211 U | | 9/2016 |
| CN | 106005862 A | | 10/2016 |
| CN | 106272415 | † | 1/2017 |
| GB | 2336838 | † | 11/1999 |
| JP | H0958814 A | | 3/1997 |
| WO | 2016151504 | † | 9/2016 |
| WO | 2016151505 | † | 9/2016 |

\* cited by examiner
† cited by third party

ROBOT FOR TRANSPORTING CARGO BOXES

FIELD

The invention relates to the field of warehousing and logistics, particularly to a robot for transporting cargo boxes.

BACKGROUND

A transporting robot is a device applied to automated materials transporting, having many advantages such as high automaticity, flexible applications, safety reliability, high efficiency and convenient maintenance, and the like, and finds its broad applications in the field of logistics and transportation in auto manufacturing industries, food industries, tobacco industries and engineering and machinery industries and the like. In addition, transporting robots are widely applied in various public service places such as airport, hospitals and office buildings. Meanwhile, these advantages make the transporting robot a key equipment in modern logistics systems and become one of the important members in the program of "machine substitution for human labor".

The concept of "shelves coming to human" proposed by the KIVA company has achieved great success, whose structure and method are stated in detail in the U.S. Pat. No. 7,850,413B2. Therefore, many unmanned transporting robots using the concept of "shelves coming to people" are emerging in China, which also have good effects. However, in order to fetch one piece of goods, the KIVA robot needs to transport the whole shelf to a picking area, which causes great wasting of resources.

Therefore, to overcome the defect of fetching only one piece of goods at a time for the KIVA robot, persons skilled in the art devote to developing a robot for transporting cargo boxes, which can transport various kinds of goods at a time, thereby increasing the transport efficiency of the transporting robot.

SUMMARY

In view of the above defects in the prior art, the technical problem to be solved by the invention is how to increase the transporting efficiency of the transporting robot. Since the cargo boxes are to be transported, whose volumes and weights are much less than those of the shelves, a plurality of cargo boxes can be transported at a time. A single cargo box at least stores one kind of goods, so various kinds of goods can be transported at a time.

In order to achieve the above aim, the present invention provides a robot for transporting cargo boxes, including a drive unit, a cargo box storing unit and a cargo box delivery unit, wherein the drive unit drives the cargo box storing unit and the cargo box delivery unit to move together; the cargo box storing unit includes one or more cargo box storing spaces; the cargo box delivery unit is configured to deliver the cargo box between the cargo box storing space and the shelf.

Further, the drive unit includes a chassis frame and drive wheels, and the drive wheels are configured to drive the robot to move or stop.

Further, the movement includes advancing, retreating, turning and spinning.

Further, the number of the drive wheels is two or more.

Further, the cargo box storing unit includes a supporting guide rail, a support plate and a reinforcing rib, wherein the supporting guide rail, the support plate and the reinforcing rib are connected mutually to form one or more cargo box storing spaces.

Further, the support plate is configured to divide the storing space.

Further, the cargo box delivery unit includes a lifting device, a rotating device and a retractor device, wherein one end of the lifting device is connected to the supporting guide rail and is slidable up and down in a vertical direction along the supporting guide rail, and the other end of the lifting device is connected to the retractor device by the rotating device.

Further, the retractor device is a fork tooth.

Further, the cargo box storing space and the cargo box are provided with machine-readable codes, and the cargo box delivery unit further includes an alignment sensor and a pose sensor.

Further, the machine-readable code is a bar code or a two-dimensional code, or a character string or an RFID.

Further, the alignment sensor is configured to detect the position of the cargo box, and the alignment sensor is a vision sensor or a radio frequency sensor.

Further, the pose sensor is configured to detect the pose of the cargo box on the cargo box delivery unit, and the pose sensor is a vision sensor or a radio frequency sensor.

Further, the support plate is an integral flat plate, or has hollows or partitions.

The procedure for the robot for transporting cargo boxes of the present invention to transport the cargo boxes to the cargo box storing unit are as follows: the transporting robot moves the cargo box delivery unit to a specified position by the lifting device, while the retractable fork tooth is rotated to a specified angle by the rotating device and extends underneath the cargo box to be transported, the cargo box is lifted by the lifting device, and the cargo box is retracted by the retractable fork tooth, and then the retractable fork tooth and the cargo box are rotated to another specified angle by the rotating device, and the cargo box is moved onto the support plate by the retractable fork tooth, and the cargo box is lowered by the lifting device and placed on the support plate, and finally the retractable fork tooth is retracted. Therefore, the robot for transporting cargo boxes of the present invention can transport various kinds of goods at a time, with high work efficiency and low energy consumption.

The concepts, specific structure and resultant technical effects of the present invention are further explained below in combination with drawings, so as to fully understand the object, features and effects of the present invention.

BRIEF DESCRIPTION OF THE DRAWINGS

FIG. 3 is a perspective diagram of the transporting robot of another preferable embodiment of the present invention; wherein:

Figure 1:
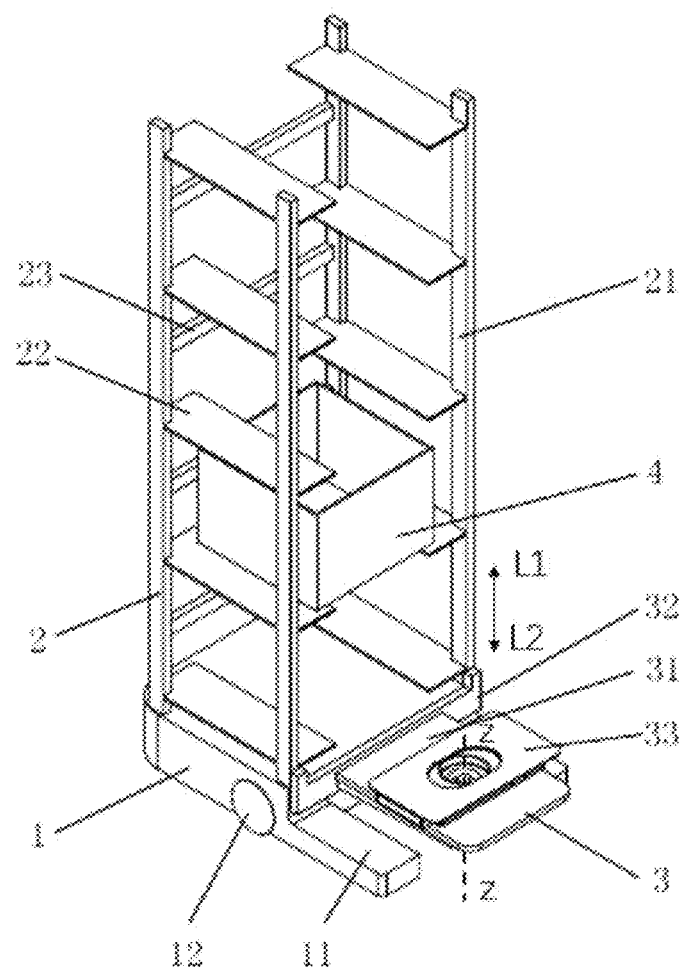
FIG. 1 is a perspective diagram of the transporting robot of one preferable embodiment of the present invention.

1. drive unit; 11. chassis frame; 12. drive wheel; 2. cargo box storing unit; 21. supporting guide rail; 22. support plate; 3. cargo box delivery unit; 31. mounting frame; 32. lifting device; 321. an end of the lifting device; 322. the other end of the lifting device; 33. retractable fork tooth; 34. rotating device; 35. pose sensor; 36. alignment sensor; 4. cargo box.

DETAILED DESCRIPTION

The present invention will be described more fully hereinafter with reference to the accompanying drawings, in which two preferred embodiments of the invention are shown, for the purpose of clarity and better understanding of the techniques. This invention may be embodied in various different forms and the invention should not be construed as being limited to the embodiments set forth herein.

In the accompanying drawings, elements with identical structure are marked with the same reference numerals, and like elements with similar structure or function are marked throughout with like reference numerals, respectively. The dimension and thickness of each of the elements in the accompanying drawings are arbitrarily shown, and are not defined. Certain elements may be shown somewhat exaggerated in thickness in the interest of clarity.

It will be understood that when an element is referred to as being "on" another element, it can be directly on the other element or there may be an intermediate element to which it is attached, and the intermediate element is attached to the other element. When an element is referred to as being "mounted to" or "connected to" another element, either one can be understood as being directly "mounted" or "connected" thereto, or via an intermediate element to be indirectly "mounted to" or "connected to" the other element.

Embodiment 1

Figure 2:
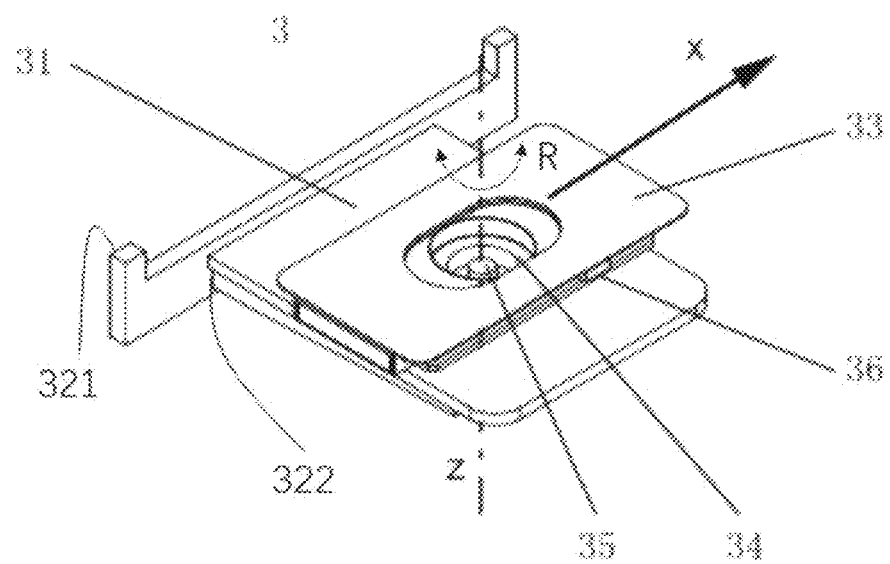
FIG. 2 is a perspective diagram of the cargo box delivery unit of one preferable embodiment of the present invention.

As shown in FIG. 1 and FIG. 2, a robot for transporting cargo boxes includes: a drive unit 1, a cargo box storing unit 2, and a cargo box delivery unit 3.

(1) The drive unit 1 is used for driving the cargo box storing unit 2 and the cargo box delivery unit 3 mounted thereon to move on the ground together.

(2) The cargo box storing unit 2 is mounted above the drive unit 1, for storing the cargo boxes 4.

(3) The cargo box delivery unit 3 is mounted to one side of the cargo box storing unit 2, for delivering the cargo box 4 into or out from the cargo box, to a specified position.

The drive unit 1 includes a chassis frame 11 and drive wheels 12, wherein the number of the drive wheels 12 is two, and the drive wheels are symmetrically mounted to two sides of the chassis frame 1. The advancing, retreating, turning and spinning of the robot can be achieved through rotations of the drive wheels 12.

The cargo box storing unit 2 includes supporting guide rails 21, support plates 22 and reinforcing ribs 23, wherein the supporting guide rails 21 are positioned above the drive unit 1, and the supporting guide rails 21 are connected with each other through the support plates 22 and the reinforcing ribs 23, and the support plates 22 are used for stacking the cargo boxes.

The cargo box storing unit 2 can store a plurality of cargo boxes.

The support plates 22 are spaced apart from each other.

The cargo box delivery unit 3 includes a frame 31, a lifting device 32, a retractable fork tooth 33 and a rotating device 34, wherein one end 321 of the lifting device 32 is connected to the supporting guide rail 21, and is slidable up and down in a vertical direction L1 and L2 along the supporting guide rail 21, and the other end 322 of the lifting device 32 is connected to the retractable fork tooth 33 by the rotating device 34.

The retractable fork tooth 33 is rotatable along the rotation axis Z by the rotating device 34, and the rotation direction is R as shown in FIG. 2.

The retractable fork tooth 33 is extendable or retractable in the x direction. If the rotating device 34 drives the retractable fork tooth 33 to rotate, the retracting direction of the retractable fork tooth 33 rotates accordingly therewith.

The cargo box delivery unit 3 further includes a pose sensor 35 for identifying the pose of the cargo box above the retractable fork tooth 33, and an alignment sensor 36 for detecting the position of the cargo box.

The pose sensor 35 may be a vision sensor or other sensors capable of acquiring the pose information.

The alignment sensor 36 may be a vision sensor or other sensors capable of acquiring the pose information.

A procedure for a robot for transporting cargo boxes to transport the cargo boxes 4 to the cargo box storing unit 2 is as follows: the robot moves the cargo box delivery unit 3 to a specified position by the lifting device 32, meanwhile the retractable fork tooth 33 is rotated to a specified angle by the rotating device 34 and extends underneath the cargo box 4 to be transported, and the cargo box 4 is lifted by the lifting device 32, and the cargo box 4 is retracted by the retractable fork tooth 33, and the retractable fork tooth 33 and the cargo box 4 are rotated to another specified angle by the rotating device 34, and then the cargo box 4 is moved onto the support plate 22 by the retractable fork tooth 33, and then the cargo box 4 is lowered by the lifting device 32 and placed on the support plate 22, and finally the retractable fork tooth 33 is retracted.

Embodiment 2

Figure 3:
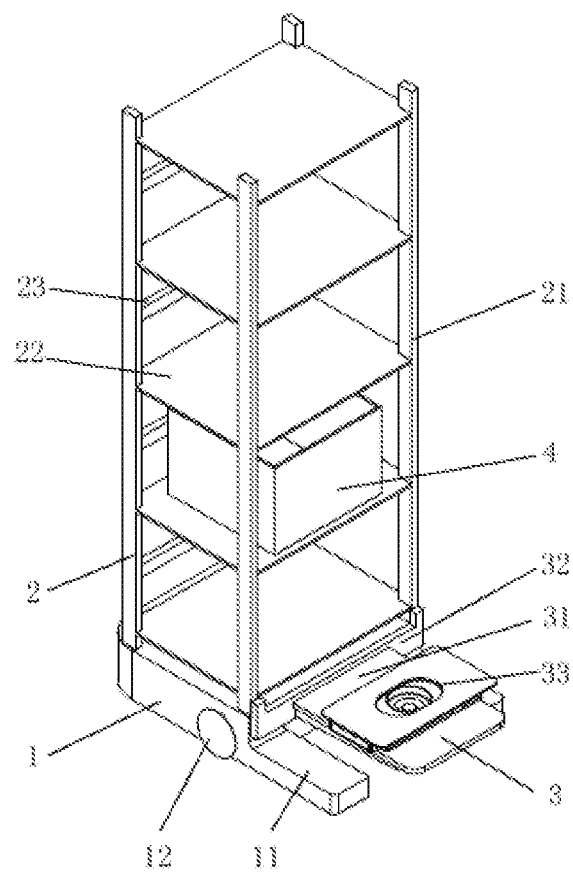

As shown in FIG. 2 and FIG. 3, a robot for transporting cargo boxes includes: a drive unit 1, a cargo box storing unit 2, and a cargo box delivery unit 3.

(1) The drive unit 1 is used for driving the cargo box storing unit 2 and the cargo box delivery unit 3 mounted thereon to move on the ground together.

(2) The cargo box storing unit 2 is mounted above the drive unit 1, for storing the cargo boxes 4.

(3) The cargo box delivery unit 3 is mounted at one side of the cargo box storing unit 2, for delivering the cargo box 4 into or out the cargo box storing unit 2, to a specified position.

The drive unit 1 includes a chassis frame 11 and drive wheels 12, wherein the number of the drive wheels 12 is two, and the drive wheels 12 are symmetrically mounted to two sides of the chassis frame 11. The advancing, retreating, turning and spinning of the robot can be achieved through rotations of the drive wheels 12.

The cargo box storing unit 2 includes supporting guide rails 21, support plates 22 and reinforcing ribs 23, wherein the supporting guide rails 21 are positioned above the drive unit 1, and are connected with each other through the support plates 22 and the reinforcing ribs 23, and the support plates 22 are used for stacking the cargo boxes.

The cargo box storing unit 2 can store a plurality of cargo boxes.

The support plate 22 is a flat plate for connecting the supporting guide rails 21 at the two sides.

The cargo box delivery unit 3 includes a frame 31, a lifting device 32, a retractable fork tooth 33 and a rotating device 34, wherein one end of the lifting device 31 is connected to the supporting guide rail 21, and is slidable up and down in a vertical direction along the supporting guide rail 21, and the other end of the lifting device 32 is connected to the retractable fork tooth 33 by the rotating device 34.

The retractable fork tooth 33 is rotatable along the z axis by the rotating device 34.

The retractable fork tooth 33 is extendable or retractable in the x direction. If the rotating device 34 drives the retractable fork tooth 33 to rotate, the retracting direction of the retractable fork tooth 33 rotates accordingly therewith.

The cargo box delivery unit 3 further includes a pose sensor 35 for identifying the pose of the cargo box above the retractable fork tooth 33, and an alignment sensor 36 for detecting the position of the cargo box.

The pose sensor 35 may be a vision sensor or other sensors capable of acquiring the pose information, for example a radio frequency sensor.

The alignment sensor 36 may be a vision sensor or other sensors capable of acquiring the pose information, for example a radio frequency sensor.

A procedure for a robot for transporting cargo boxes to transport the cargo boxes 4 to the cargo box storing unit 2 is as follows. The robot moves the cargo box delivery unit 3 to a specified position by the lifting device 32, meanwhile the retractable fork tooth 33 is rotated to a specified angle by the rotating device 34 and extended underneath the cargo box 4 to be transported, and the cargo box 4 is lifted by the lifting device 32, and the cargo box 4 is retracted by the retractable fork tooth 33, and the retractable fork tooth 33 and the cargo box 4 are rotated to another specified angle by the rotating device 34, and the cargo box 4 is moved onto the support plate 22 by the retractable fork tooth 33, and then the cargo box 4 is lowered by the lifting device 32 and placed on the support plate 22, and finally the retractable fork tooth 33 is retracted.

The preferred specific embodiments of the invention have been described in detail above. It is to be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. A robot for transporting cargo boxes, comprising a drive unit, a cargo box storing unit and a cargo box delivery unit, wherein the drive unit drives the cargo box storing unit and the cargo box delivery unit to move together; the cargo box storing unit comprises one or more cargo box storing spaces; the cargo box delivery unit is configured to deliver the cargo box between the cargo box storing space and a shelf, wherein the cargo box storing unit comprises a supporting guide rail;

wherein the cargo box delivery unit comprises a lifting device, a rotating device and a retractor device, wherein one end of the lifting device is connected to the supporting guide rail and is slidable up and down in a vertical direction along the supporting guide rail, and the other end of the lifting device is connected to the retractor device by the rotating device;

wherein a rotation axis of the retractor device is parallel to a moving direction of the lifting device and passes through the retractor device.

2. The robot for transporting cargo boxes according to claim 1, wherein the retractor device is a fork tooth.

3. The robot for transporting cargo boxes according to claim 1, wherein the cargo box storing unit further comprises a support plate, the support plate is configured to divide the storing space.

4. The robot for transporting cargo boxes according to claim 1, wherein the cargo box storing unit further comprises a reinforcing rib and a support plate, wherein the supporting guide rail, the support plate and the reinforcing rib are connected mutually to form one or more cargo box storing spaces.

5. The robot for transporting cargo boxes according to claim 4, wherein the support plate is an integral flat plate, or has hollows or partitions.

6. The robot for transporting cargo boxes according to claim 1, wherein the drive unit comprises a chassis frame and drive wheels, the drive wheels configured to drive the robot to move or stop.

7. The robot for transporting cargo boxes according to claim 6, wherein the movement comprises advancing, retreating, turning and spinning.

8. The robot for transporting cargo boxes according to claim 6, wherein the number of the drive wheels is two or more.

9. The robot for transporting cargo boxes according to claim 1, wherein the cargo box storing space and the cargo box are provided with machine-readable codes, and the cargo box delivery unit further comprises an alignment sensor and a pose sensor.

10. The robot for transporting cargo boxes according to claim 9, wherein the machine-readable code is a bar code or a two-dimensional code, or a character string or an RFID.

11. The robot for transporting cargo boxes according to claim 9, wherein the alignment sensor is configured to detect the position of the cargo box, and the alignment sensor is a vision sensor or a radio frequency sensor.

12. The robot for transporting cargo boxes according to claim 9, wherein the pose sensor is configured to detect the pose of the cargo box on the cargo box delivery unit, and the pose sensor is a vision sensor or a radio frequency sensor.

* * * * *